Feb. 4, 1941.   H. E. CARR   2,230,828
PIE AND PASTRY BOARD
Filed Oct. 27, 1939

INVENTOR.
Hettie E. Carr
BY James Harrison Bowen
ATTORNEY.

Patented Feb. 4, 1941

2,230,828

UNITED STATES PATENT OFFICE 2,230,828

PIE AND PASTRY BOARD

Hettie E. Carr, Glencoe, Ill.

Application October 27, 1939, Serial No. 301,533

1 Claim. (Cl. 107—46)

The purpose of this invention is to provide a pastry board the exact size and shape of a pie tin or plate so that the dough may be rolled to the periphery thereof, the plate inverted and placed upon the dough, and then the plate, dough and board inverted so that the dough will drop downward into the plate, forming the usual lining therefor.

The invention is a circular board having a flat upper surface with a lower surface of a somewhat smaller diameter providing a continuous curved recess in the periphery, shaped to accommodate the tips of the fingers to enable holding when inverting, and in the under surface of the board is a hollowed out portion providing a mixing bowl for the pie dough, so that the dough may be mixed in one side, rolled on the other, and then readily deposited in the pie plate without handling after it is rolled.

Pastry, and particularly pie dough is generally rolled upon a flat board, cloth, or other surface, and when it is the proper thickness it must be picked up and placed in the pie plate, and as it has no stability and is relatively thin this is, sometimes, very difficult, and even when successfully accomplished it must be trimmed, because it is substantially impossible to guess exactly the correct size. Bread boards, which are generally used for this purpose, are usually square, and these are formed with perpendicular sides so that it would be very difficult to raise these from a flat surface to place the dough in the plate even if one were successful in rolling the dough to the correct size.

The object of this invention is, therefore, to provide a pastry board the exact size and shape of a pie plate and to provide the board with a circumferential recess so that it may readily be picked up and inverted.

Another object is to provide a pastry or bread board with finger tip recesses to enable it to be readily gripped and held.

A further object is to provide a combination board in which dough may be mixed in one side and rolled upon the other.

And a still further object is to provide a pie and pastry board for facilitating placing pie dough in pie plates which is of a relatively simple and economical construction.

With these ends in view the invention embodies a flat circular piece of wood or other material, having a continuous recess below the upper surface and in the periphery thereof, and a hollow area forming a mixing bowl in the under surface.

Other features and advantages of the invention will appear from the following description taken in connection with the drawing, wherein.

Figure 1:
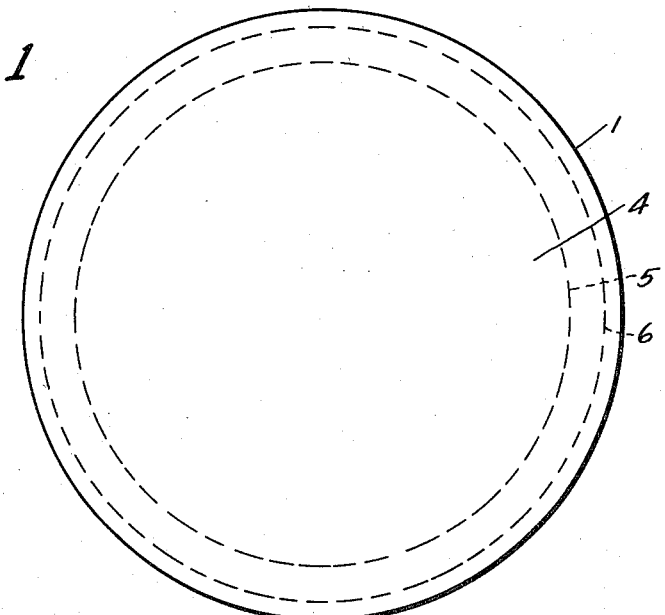
Figure 1 is a plan view of the board with the lower part shown in dotted lines.
Figure 2:
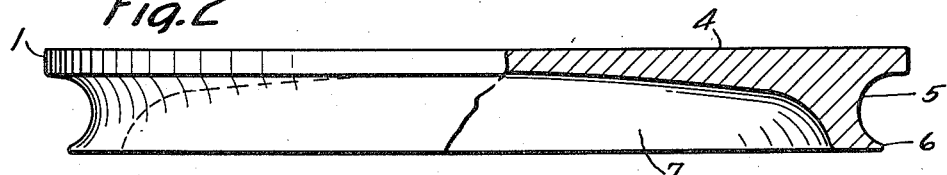
Figure 2 is a view showing a side elevation of the board with part broken away showing a section therethrough.

In the drawing the board is shown as it may be made wherein numeral 1, indicates the board, numeral 2, a pie plate, and numeral 3, a layer of dough.

The board 1 is formed with a flat smooth upper surface 4, a continuous circumferential recess 5, a base 6, and a recess 7 in the base providing an open area for mixing dough to be rolled upon the board, and the size of this space may be equal to the amount of material required for enough dough to make a pie crust, the diameter of the dough, when rolled out upon the board being equal to that of the board. It will be noted in Figure 3 that the diameter of the board and also of the dough thereon is slightly larger than that of the pie plate, however, it will be noted in Figure 4 that the dough and plate are of the same diameter, but this extra dough is required to compensate for the sloping sides of the pie plate, and after the dough has dropped into the plate the periphery thereof should be equal to that of the plate so that it may be pinched or formed in the regular manner.

Figure 3:
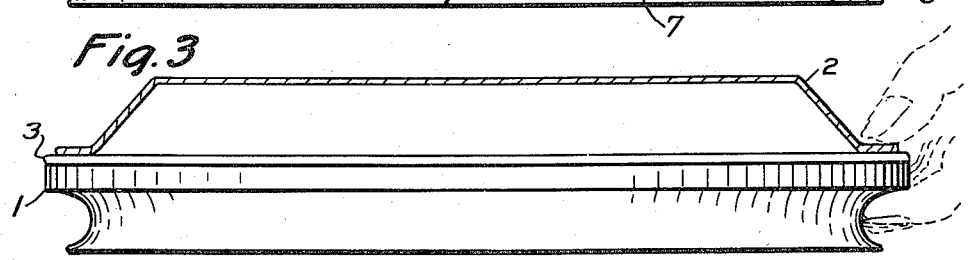
Figure 3 shows a side elevation of the board with a layer of dough on the board, and a pie plate thereon in an inverted position.
Figure 4:
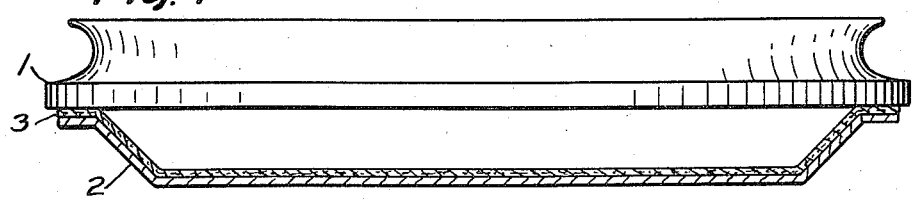
Figure 4 is a similar view with the board inverted and the dough deposited in the pie plate.

In Figures 3 and 4 the recess 7 is not indicated in dotted lines and it will be understood that the board may be formed with or without the recess as may be desired.

It will be understood that other changes may be made in the construction without departing from the spirit of the invention. One of which changes may be in the use of a board of any other shape to correspond with a plate of any other shape, another may be in the thickness or proportionate sizes of the board, and still another may be in the use of other means for forming gripping or finger recesses in the under part of the board.

The construction will be readily understood from the foregoing description. In use the board may be provided as shown and described, and, as hereinbefore stated, the dough may be mixed in the recess in the under side of the board, or in any device, and may be rolled upon the board, rolling the dough carefully in all directions and rolling it just to the edge at all points. The plate may then be placed upon the dough and the board, plate, and dough inverted as hereinbefore described, so that the dough is carefully and evenly deposited in the plate.

Having thus fully described the invention, what I claim as new, and desire to secure by Letters Patent, is:

A circular pie and pastry board comprising a relatively thin board of sufficient size to accommodate the dough for the crust of a single pie, the upper surface of said board being flat and smooth continuously to the periphery thereof, said board having an inwardly extending recess of sufficient size to accommodate the fingers extending around the periphery thereof.

HETTIE E. CARR.